D. P. DAUGHERTY.
POISON DISTRIBUTER.
APPLICATION FILED OCT. 26, 1915.
1,190,272.
Patented July 11, 1916.
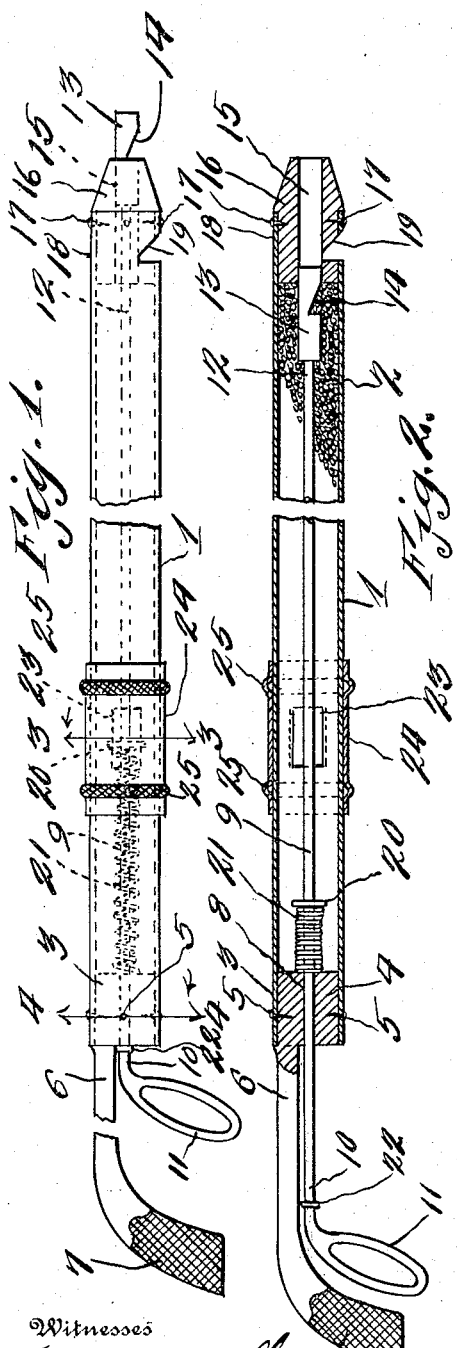
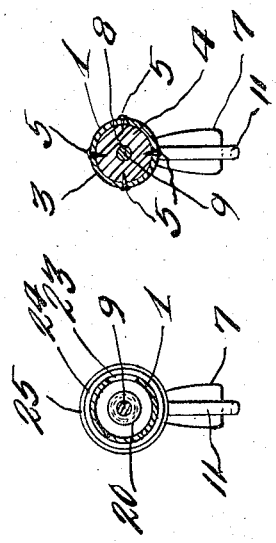
Witnesses
Inventor
D. P. Daugherty
By D. Swift & Co.
his Attorneys
THE NORRIS PETERS CO., PHOTO-LITHO., WASHINGTON, D. C.

UNITED STATES PATENT OFFICE.

DANIEL P. DAUGHERTY, OF WORDEN, OREGON, ASSIGNOR OF ONE-THIRD TO H. L. VEIT AND ONE-THIRD TO RALPH O. VINCENT.

POISON-DISTRIBUTER.

1,190,272.  Specification of Letters Patent.  Patented July 11, 1916.

Application filed October 26, 1915. Serial No. 58,084.

*To all whom it may concern:*

Be it known that I, DANIEL P. DAUGHERTY, a citizen of the United States, residing at Worden, in the county of Klamath, State of Oregon, have invented a new and useful Poison-Distributer; and I do hereby declare the following to be a full, clear, and exact description of the invention, such as will enable others skilled in the art to which it appertains to make and use the same.

This invention relates to an improved poison distributer, and more particularly to that class, which are used for distributing poison grain or the like in different localities frequented by certain animals which are obnoxious to various crops, such animals as squirrels and the like, so as to poison the same.

One of the objects of the invention is the provision of a distributing gun, which is simple, efficient and practical in construction, consisting of a tubular container having a restricted passage or opening in the distributing end, there being a spring actuating plunger in the tubular container, which plunger is supplied at one end with a piston having a pocket, which piston is movable in the restricted passage, so that as the plunger is moved or reciprocated, the piston will discharge poison grain at various intervals. It is to be understood, however, that this distributer may also be used as a weed exterminator to destroy obnoxious weeds and parasites, for instance thistles, burdocks, dandelions and the like. In using the device for this purpose the contracted end of the poison container may be forced into the ground near the long roots of such weeds and the like, so that by actuating the piston, deposits of poisonous solution or powder may be left about the roots of weeds.

In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation of the improved poison distributer constructed in accordance with the invention. Fig. 2 is a longitudinal sectional view through the distributer, showing a plunger retracted, in such a position that the pocket in the piston of the plunger may receive a deposit of poisonous grain. Fig. 3 is a cross sectional view on line 3—3 of Fig. 1. Fig. 4 is a cross sectional view on line 4—4 of Fig. 1.

Referring more especially to the drawing, 1 designates the tubular container, designed to contain poisonous grain 2. The end 3 of the container has a plug secured therein by the screws or the like 5. This plug has a restricted shank 6 terminating in a laterally extending handle 7, resembling a pistol handle. This plug 4 has an opening 8 constituting a guide for the plunger rod 9, the end 10 of which terminates in a loop 11 constituting a finger grip, which, when the plunger rod is retracted is in close position to the handle 7. The other end portion 12 of the plunger rod is provided with a piston 13 having a notch or pocket 14, and is designed to move in the passage or opening 15 of the plug 16, which is secured by the screws or the like 17 in the end portion 18 of the tubular container. The plug 16 has an opening 19, which also opens through one side of the end 18 of the tubular container, and in some instances the piston 13 is so moved that the pocket or recess registers with the opening 19 and allows a deposit of poisonous grain to pass out through the opening 19. However, the most of the time the plunger rod is partially turned, to throw the pocket 14 out of registration with the opening 19, in which case, as the piston 13 is moved backward and forward, the piston is protruded far enough beyond the plug 16, so that the pocket 14 will deposit poisonous grain from the extreme end of the passage 15. The plunger rod 9 is provided with a collar 20, between which and the plug 4 a coil spring 21 is interposed, so that when the plunger is retracted against the tension of the spring 21, the tension of the spring will actuate the plunger rod sufficiently to move the piston, so that the pocket or recess 14 will be beyond the extreme end of the passage 15, so as to permit a deposit of poisonous grain to drop on the ground, in such localities that are traversed or frequented by obnoxious animals, that is obnoxious to various crops. When the spring 21 so actuates the plunger rod 9, the rod is limited in its movement by the shoulder 22 coming in contact with the plug 4. The wall of the poisonous grain container is provided with an opening 23, through which the poisonous grain may be passed into the container, after which the sleeve 24, which is telescopically mounted upon a container may be moved to close the opening. The sleeve is provided with a pair of annular bulges 25, to prevent the operator's hand from slipping in one direction or the other off the sleeve, when moving the sleeve. The end portion of the plug 16 is tapered sufficiently to enable the plug to pierce the soil, when it is desired to use the device as a weed exterminator, in which case, a poisonous powder or the like may be substituted instead of the poisonous grain.

The invention having been set forth, what is claimed as new and useful is:—

1. A poison distributer, comprising a poisonous grain tubular container, plugs secured in both ends of the container, one plug terminating in a shank having a handle, the other plug being partially tapered and provided with a longitudinal passage, a plunger rod guided in the plug having the handle and provided with a piston to reciprocate in the longitudinal passage of the other plug, said piston having the pocket, to carry grain from the container toward and beyond the tapered end of one of the plugs, and spring tensioned means, against the action of which the plunger rod is retracted, and when the plunger is released the spring tensioned means actuates the plunger rod to move the piston, so that its pocket will protrude beyond the tapered end of one of the plugs.

2. A poison distributer, comprising a poisonous grain tubular container, plugs secured in both ends of the container, one plug terminating in a shank having a handle, the other plug being partially tapered and provided with a longitudinal passage, a plunger rod guided in the plug having the handle and provided with a piston to reciprocate in the longitudinal passage of the other plug, said piston having the pocket, to carry grain from the container toward and beyond the tapered end of one of the plugs, and spring tensioned means, against the action of which the plunger rod is retracted, and when the plunger is released the spring tensioned means actuates the plunger rod to move the piston, so that its pocket will protrude beyond the tapered end of one of the plugs, said plunger having a shoulder to contact with the plug having the handle to limit the plunger so that the pocket assumes the position just beyond the tapered end of the tapered plug, the container having an opening through which the poisonous grain may be deposited into the container, and an opening through the wall of the container and the tapered plug to be registered with by the pocket in the piston.

In testimony whereof I have signed my name to this specification in the presence of two subscribing witnesses.

DANIEL P. DAUGHERTY.

Witnesses:
JAMES B. FLOYD,
C. D. CHORPENING.

Copies of this patent may be obtained for five cents each, by addressing the "Commissioner of Patents, Washington, D. C."